United States Patent [19]
Schwengler et al.

[11] Patent Number: 5,897,612
[45] Date of Patent: Apr. 27, 1999

[54] PERSONAL COMMUNICATION SYSTEM GEOGRAPHICAL TEST DATA CORRELATION

[75] Inventors: Thomas Schwengler, Lakewood; Patrick L. Perini, Broomfield, both of Colo.

[73] Assignee: U S West, Inc., Englewood, Colo.

[21] Appl. No.: 08/998,091

[22] Filed: Dec. 24, 1997

[51] Int. Cl.$^6$ .............................. H04Q 7/00; G01S 5/00
[52] U.S. Cl. ....................... 702/150; 455/456; 455/457; 701/207; 701/210; 342/451
[58] Field of Search .................................. 455/433, 456, 455/457; 701/207, 209, 210; 702/150, 157, 158; 342/451, 457

[56] References Cited

U.S. PATENT DOCUMENTS

| | | | |
|---|---|---|---|
| 5,490,203 | 2/1996 | Jain et al. | 455/435 |
| 5,602,903 | 2/1997 | LeBlanc et al. | 455/456 |
| 5,606,596 | 2/1997 | Jain et al. | 455/433 |
| 5,640,323 | 6/1997 | Kleimenhagen et al. | 701/207 |
| 5,646,630 | 7/1997 | Sheynblat et al. | 701/207 |
| 5,666,662 | 9/1997 | Shibuya | 455/456 |
| 5,732,351 | 3/1998 | Olds et al. | 455/456 |

*Primary Examiner*—John Barlow
*Assistant Examiner*—Bryan Bui
*Attorney, Agent, or Firm*—Brooks & Kushman, P.C.

[57] ABSTRACT

A method for correlating data taken during two test drives through the coverage area of a personal communication system, the data from each test set including a sequence of locations along a drive, a location from the first set being correlated with a location from the second set when the location from the second set is within a correlation distance from the location from the first set, the method including determining the correlation distance; setting the search point as a location in first set; determining a possible first correlated location from the first set and a corresponding first correlated location from the second set using the search point, the correlation distance, and a search radius if no correlated data has yet been found; otherwise determining a possible next correlated location from the first set and a corresponding next correlated location from the second set using the search point, the correlation distance, the correlated location from the second set that was most recently found, and a search number. The effects of data taken during slow or halted movement are reduced by averaging or discounting locations. The effects of changing environmental variables may be reduced by determining at least one data variable that should have remained constant between data for correlated locations and, for each geographically correlated pair, determining any difference between data values for one of these variables, and compensating data from the correlated pair using the determined difference.

16 Claims, 2 Drawing Sheets

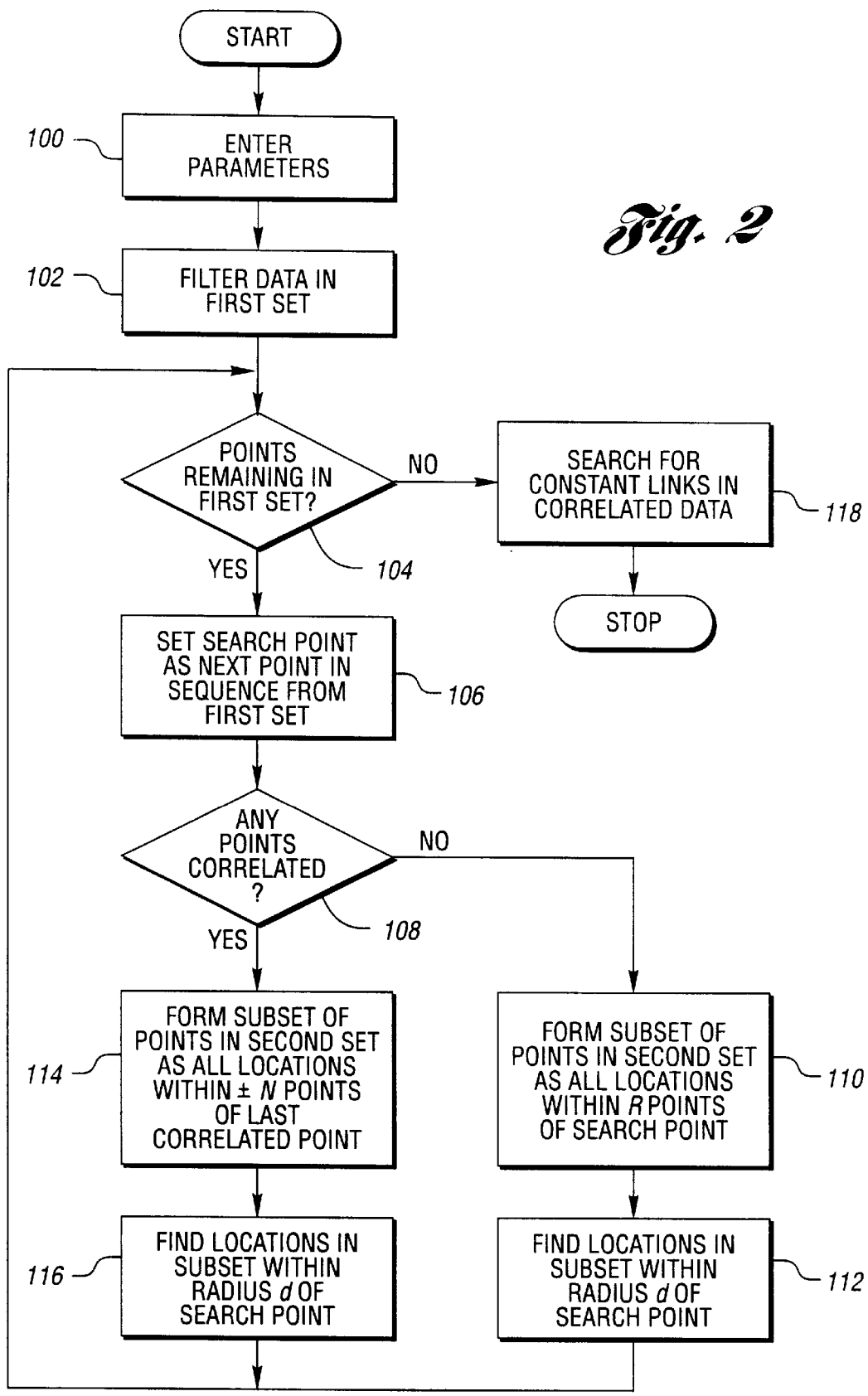

PERSONAL COMMUNICATION SYSTEM GEOGRAPHICAL TEST DATA CORRELATION

TECHNICAL FIELD

The present invention relates in general to a method for correlating spatial data from multiple sets and in particular to correlating data sets from two test runs of a personal communication system.

BACKGROUND ART

A wireless personal communication system (PCS) provides a variety of services including telephony, paging and networking. Typically, a PCS consists of a plurality of geographically-spaced base stations operated by a service provider and a plurality of telecommunication devices operated by customers. The customers may roam throughout the area covered by the PCS and remain capable of sending and receiving information.

Testing PCS base station equipment often requires moving test equipment through the geographic area covered by the base station. The test equipment may be capable of receiving data from the base station, transmitting information to the base station, and recording results as well as additional information such as location coordinates and time.

During testing of PCS equipment, it may be necessary to perform multiple tests at different times. For example, consider tests to compare low noise amplifiers from different manufacturers that may be used in order to increase performance in the base station receive path. A first amplifier may be installed. A test drive is then conducted while data is collected. The first amplifier may then be replaced by a second amplifier. A second test drive is then conducted while data is collected. In order to compare the operation of the two amplifiers, only data from locations with close geographic correlation should be considered. Also, factors including excessive data acquired during slow or halted movement and changes in environmental conditions must be taken into account.

What is needed is a method of correlating the data taken in one test sequence with data taken during another test sequence covering similar geographic area. Such a method should be able to reduce the effects of data taken at slow or halted movement. Such a method should also be able to compensate for differing environmental conditions when possible. The method should complete data correlation without requiring excessive computational resources.

SUMMARY OF THE INVENTION

It is a primary object of the present invention to correlate geographic data from two sets.

Another object of the present invention is to minimize the effects of data taken during slow or halted movement.

Still another object of the present invention is to minimize environmental factors by finding links between data sets that should have the same value and using any difference in data values to reduce the environmental factors.

A further object of the present invention is to minimize the computational complexity required to correlate geographic data from two test sets.

In carrying out the above objects and other objects and features of the present invention, a method is provided for determining each correlated location in a first set of locations and a corresponding correlated location in a second set. A location in the second set is correlated with a location in the first set if the two locations are within a correlation distance.

In one embodiment, the first correlated location is determined by examining all locations of the second set within a search distance of the location from the first set under consideration. After a first correlated location is found, subsequent correlated locations are determined by examining locations from the second set that are within a search number of locations from the most recently found correlated location of the second set.

In another embodiment, the effects of data taken during slow or halted movement along the drive are reduced by averaging data in geographic clusters.

In still another embodiment, the effects of data taken during slow or halted movement along the drive are reduced by not considering data taken at a velocity below a threshold.

In a further embodiment, environmental effects may be reduced by determining a link that was not affected by changes in base station equipment between the two drives, determining data variables for the link that should not have changed and, for each correlated pair of locations, determining the difference in at least one variable that should not have changed and compensating data based on the difference.

In the preferred embodiment, all of the above embodiments are available.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is a flow diagram of the method according to an embodiment of the present invention.

BEST MODES FOR CARRYING OUT THE INVENTION

Figure 1:
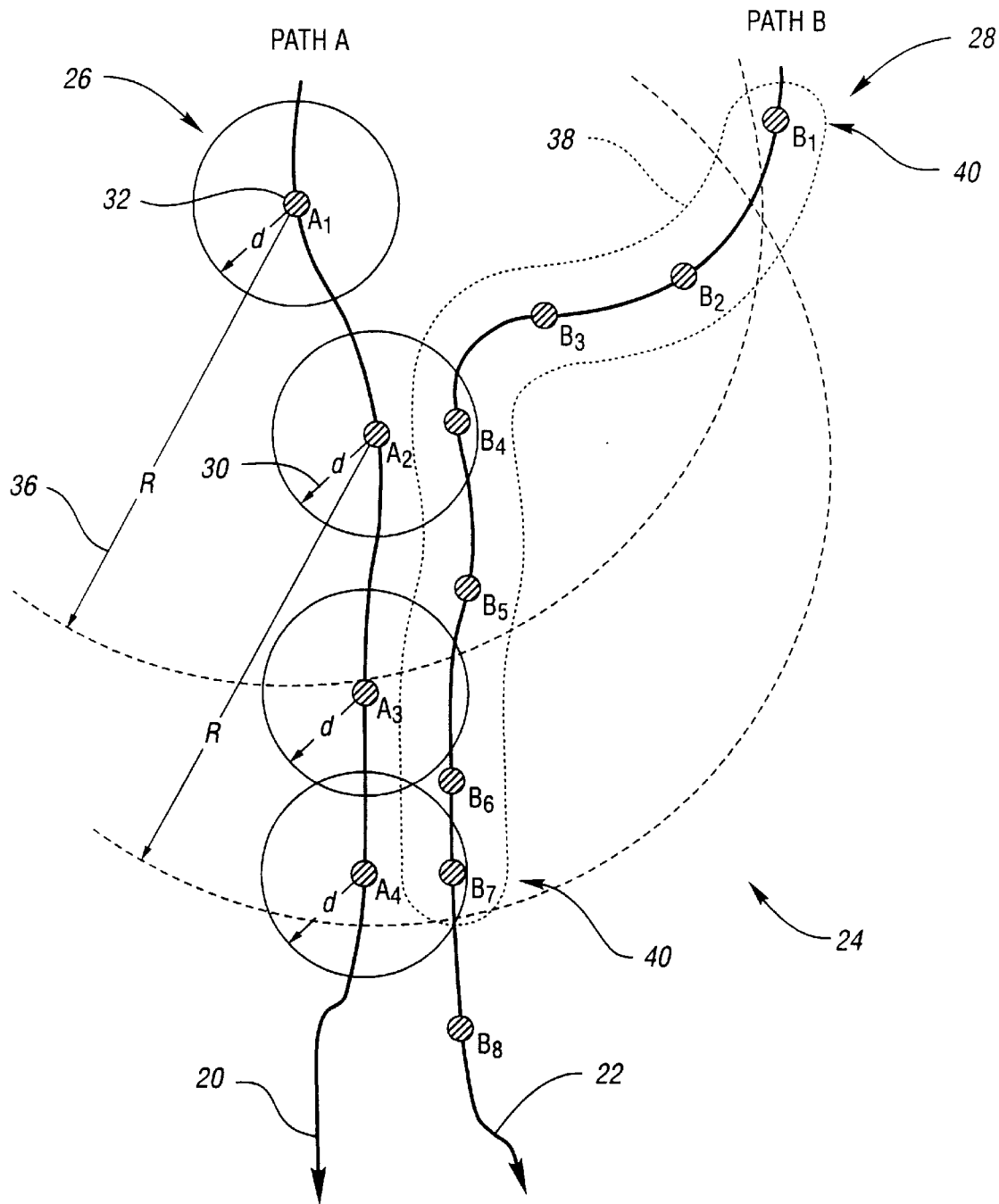
FIG. 1 is a diagram of an illustrative example according to the present invention.

Referring now to FIG. 1, a diagram illustrating the method of the present invention is shown. A first path 20 and a second path 22 traverse through a geographic area shown generally by 24. Data was collected at various locations along first path 20 as indicated by points $A_1$ through $A_4$. Data was also collected at various locations along second path 22 as indicated by points $B_1$ through $B_8$. The locations and corresponding data along each path make up a sequential set. The set of locations for first path 20 is shown generally by 26. The set of data for second path 22 is shown generally by 28.

First path 20 and second path 22 may represent routes taken along two test drives throughout the coverage area of a PCS. For example, the points along first path 20 may represent a sequence of data sampling locations taken with a particular low noise amplifier installed in the receiving path of a base station. Second path 22 may represent a sequence of data sampling locations with a different amplifier. A comparison of the operating characteristics of the two amplifiers may be desired. Possible parameters collected on the mobile side include the ratio of energy per chip to interference level ($E_c/I_o$), mobile transmission power ($MT_x$), mobile reception power ($MR_x$), transmit gain adjust (TGA), and forward frame error rate (FFER). Possible parameters collected on the base station side include transmit gain, ratio of received energy per bit to noise level ($E_b/N_o$), transmission power ($T_x$), and reverse frame error rate (RFER). Since the performance of reception from and transmission to the base station may be highly dependent on geographic location within the coverage area, only those points in the first set which are correlated with a corresponding point in the second set will be used for comparison.

Data correlation is determined by geographic closeness. A point in second set 28 is correlated with a point in first set 26 if the point from second set 28 is within a correlation distance d, shown as 30, of the point from first set 26. This can be seen in FIG. 1 by circles of radius d around locations in first set 26.

The first sequential point of first set 26 which is correlated with a point in second set 28 is determined. The first point in first set 26, $A_1$, is made the first search point 32. A search set 34 is formed consisting of all locations in second set 28 that fall within a large region about search point 32. In one embodiment of the present invention, this region is circular with a search radius R as shown by 36. In the example of FIG. 1, points $B_2$, $B_3$, $B_4$ and $B_5$ make up the search set for point $A_1$.

Once the search set has been determined, each point in search set 34 is checked to see if it is within correlation distance 30 of search point 32. Any point within correlation distance 30 is a candidate for the first correlated location of the second set. If any candidate location is found, the first correlated location of the first set is the search point. If no candidate is found, the search point is not the first correlated location of the first set. If no locations of search set 34 are within correlation distance 30 of search point 32, the next location of first set 26 is made search point 32 and the process is repeated. New points from first set 26 are chosen in sequence until a first correlated point in set 26 and a corresponding first correlated point in set 28 are determined.

If only one candidate is found, the first correlated location of the second set is the candidate location. It is possible that, in any search set, more than one location is a candidate location. In one embodiment, the candidate location geographically closest to search point 32 is chosen as the first correlated point of the second set. In another embodiment, the first correlated point of the second set is created through a weighted average of all candidate locations. Any data corresponding to the locations used to create the new location is also averaged to create data for the new location. The data corresponding to points in second set 28 that are closer to search point 32 are weighted heavier than the data from points which are further away.

In the example of FIG. 1, location $A_2$ from first set 26 yields search set 34 containing points $B_2$ through $B_7$, of which point $B_4$ is within correlation distance 30. Hence $A_2$ is the first correlated location of the first set and $B_4$ is the first correlated location of the second set.

Once a first correlated location in first data set 26 is found, a different technique is used when searching for a next pair of correlated locations. As before, the next search point 32 is determined as the next location in first set 26 to be analyzed. However the search set, now known as correlation set 38, is found based on sequential position within second set 28. Locations in second set 28 are members of correlation set 38 if they are within a number of locations of the most recently found correlated location of second set 28. The number of locations is known as the search number N, shown generally as 40. In the example of FIG. 1, with search number 40 equal to three, search point 32 being $A_3$, and point $B_4$ as the last correlated location of the second set, correlation set 38 would include all points with subscripts equal to or less than 4+3=7 and with subscripts equal to or greater than 4−3=1.

Any point in correlation set 38 within correlation distance 30 of search point 32 is a candidate location for the next correlated location of the second set. If any candidates are found, the next correlated location of the first set is search point 32. If no candidates are found, search point 32 is not the next correlated location of the first set.

As in the search for the first correlated point discussed above, if only one candidate was found, the next correlated location of the second set is the candidate location. If more than one candidate location for next correlated location of the second set exists, the location closest to search point 32 or a weighted average of candidate locations may be used.

Referring again to the example shown in FIG. 1, since none of the points $B_1$ through $B_7$ are within correlation distance 30 of $A_3$, $A_3$ is not the next correlated location of the first set. Location $A_4$ becomes the next search point 32, with the same correlation set as used when search point 32 was $A_3$. In this case, point $B_7$ is within correlation distance 30, making $A_4$ the next correlated point of first set 26 and $B_7$ the next correlated point of second set 28.

Referring now to FIG. 2, a flow diagram of the method according to an embodiment of the present invention is shown. As will be appreciated by one of ordinary skill in the art, the operations illustrated in the flow diagram are not necessarily sequential operations. Similarly, operations may be controlled by software, hardware, or a combination of both. The present invention transcends any particular implementation and the embodiment is shown in a sequential flow chart form for ease of illustration.

Parameters are entered 100. These parameters include correlation distance 30, search radius 36, and search number 40 as well as references to the two sets of geographic data 26 and 28. In the preferred embodiment, each set of data may include data collected from mobile equipment, the data derived in part from signals transmitted from a base station, as well as data transmitted from mobile equipment and collected at the base station.

In one embodiment, correlation distance 30 may be calculated. A location in first set 26 is specified. A location in second set 28 which is closest to the selected location in first set 26 is found. Correlation distance 30 is then made the distance between the selected location in first set 28 and the closest location in second set 28.

First set data is filtered 102. Clusters of locations indicating data taken during slow or halted movement may overly influence results. Further, locations representing slow or halted movement may have corresponding data affected by undesirable fading properties. Therefore, a filtering procedure may be desired. In one embodiment, clusters of locations in first set 26 are averaged into a single point. Correlation distance 30 may be used to determine membership in the cluster.

In another embodiment, any location in first set 26 representing data taken at a velocity less than a threshold is removed from consideration. This may be done by examining each location in first set 26 and deleting or marking those locations corresponding to data taken at a velocity less than the threshold.

A loop is used to examine each location in first set 26 for correlation, as indicated by block 104. If every location has been considered, the loop is exited and a search for constant links as in block 118 may be performed. If not, the next point is considered as in block 106 below.

The next point in sequence from first set 26 is set as search point 32, as shown by block 106.

Depending on whether or not any correlations between a location in first set 26 and a corresponding location in second set 28 have yet been found, a different method for forming a search set is used as shown by block 108. If no correlated points have yet been found, the next step is indicated by block 110 described below. If any correlated points have been found, the next step is indicated by block 114 described below.

A search set 34 is formed 110. This subset of second set 28 includes any location within the search radius R 36 of search point 32. This step is further described with regards to FIG. 1 above.

The locations within correlation distance d 30 of search point 32 are found 112. This step is further described with regards to FIG. 1 above.

Correlation set 38 is formed 114. This subset of second set 28 includes any location with a sequence number within the search number N 40 of the most recently found correlated location of second set 28. This step is further described with regards to FIG. 1 above.

The locations within correlation distance d 30 of search point 32 are found 116. This step is further described with regards to FIG. 1 above.

Constant links are searched for in correlated data 118. Even after point-by-point geographical correlation has been accomplished, some differences between two similar runs testing the same equipment may occur. These differences may be due to environmental factors such as varying atmospheric conditions, background noise, and temperatures. Although different frequency channels are used for transmission and reception, and environmental factors may affect the two channels differently, the two channels are generally adjacent so that any differences in environmental effects between the transmit and receive channels at a given time are small relative to the differences in environmental effects due to sampling at different times and may be ignored in a first approximation. Therefore, the changes between samples in geographically correlated data for a link with no hardware modifications may be used to correct for environmental factors between samples on a link for which hardware modifications occurred between test drives.

Consider a simplex base station with independent transmission and reception paths. A first test drive done with existing base station equipment and a second test drive with a new amplifier in the base station receiver are performed. Since the link between the mobile receiver and the base station transmitter has not been modified, geographically correlated data for this link should have the same values between the two test sequences. Any difference in these values should be due to environmental factors that have changed in the time between taking data for the correlated location of the first set and the corresponding correlated location of the second set. For example, the ratio of the mobile received power $MR_x$ to the base station transmitted power $T_x$ should be the same for geographically correlated data from both sets. If the ratio is not the same, the difference may be used to determine the effects of environmental factors. These effects can then be removed from data describing the mobile-to-base station link, increasing the accuracy of the test.

For the case of a duplex base station, where the same physical antenna cable is used for both transmission and reception paths, downlink losses due to duplexors used to separate the paths must be considered. Since duplexor losses can be precisely quantified, the effects of the duplexors can be removed from environmental corrections.

While the best modes for carrying out the invention has been described in detail, those familiar with the art to which this invention relates will recognize various alternative designs and embodiments for practicing the invention as defined by the following claims.

What is claimed is:

1. A method for correlating test data taken during two drives through the coverage area of a personal communication system, wherein the data from the first test set includes a sequence of locations along a first drive and the data from the second test set includes a sequence of locations along a second drive, and wherein a location from the first set is correlated with a location from the second set when the location from the second set lies within a correlation distance of the location from the first set, the method comprising:

obtaining the correlation distance;

determining the search point as the first location of the first set;

determining a possible first correlated location from the first set and a corresponding first correlated location from the second set using the search point, the correlation distance, and a search radius if no correlated data has yet been found;

otherwise, if a correlated location has been found, determining a possible next correlated location from the first set and a corresponding next correlated location from the second set using the search point, the correlation distance, the correlated location from the second set that was most recently found, and a search number; and determining the next search point as the next location of the first set and repeating the step of determining a possible correlated location from the first set and a corresponding correlated location from the second set.

2. The method of correlating test data taken during two drives of claim 1 wherein the step of determining a possible first correlated location from the first set and a corresponding first correlated location from the second set using the search point, the correlation distance, and a search radius if no correlated data has yet been found comprising:

determining a search set of locations from the second set as all locations that are within the search radius of the search point;

determining as candidates all locations from the search set that are within the correlation distance of the search point; and determining the first correlated location from the first set as the search point and the first correlated location from the second set as the candidate closest to the search point if any candidates were found;

otherwise, if no candidates were found, determining that the search point cannot be the first correlated data location of the first set.

3. The method of correlating test data taken during two drives of claim 1 wherein the step of determining a possible first correlated location from the first set and a corresponding first correlated location from the second set using the search point, the correlation distance, and a search radius if no correlated data has yet been found comprising:

determining a search set of locations from the second set as all locations that are within the search radius of the search point;

determining as candidates all locations from the search set that are within the correlation distance of the search point; and determining the first correlated location from the first set as the search point and the first correlated location from the second set as the weighted average of all candidate locations if any candidates were found, giving greater weight to candidates closer to the search point;

otherwise, if no candidates were found, determining that the search point cannot be the first correlated data location of the first set.

4. The method for correlating test data taken during two drives of claim 1, the step of determining a possible next correlated location from the first set and a corresponding next correlated location from the second set using the search point, the correlation distance, the correlated location from the second set that was most recently found, and a search number comprising:

determining a search set of locations from the second set as all locations that are within the search number of locations from the most recently found correlated location from the second set both in increasing order in which the data was taken and in decreasing order in which the data was taken;

determining as candidates all locations from the search set that are within the correlation distance of the search point; and determining the next correlated location from the first set as the search point and the next correlated location from the second set as the candidate closest to the search point if any candidates were found;

otherwise, if no candidates were found, determining that the search point cannot be the next correlated data location of the first set.

5. The method for correlating test data taken during two drives of claim 1, the step of determining a possible next correlated location from the first set and a corresponding next correlated location from the second set using the search point, the correlation distance, the correlated location from the second set that was most recently found, and a search number comprising:

determining a search set of locations from the second set as all locations that are within the search number of locations from the most recently found correlated location from the second set both in increasing order in which the data was taken and in decreasing order in which the data was taken;

determining as candidates all locations from the search set that are within the correlation distance of the search point; and determining the next correlated location from the first set as the search point and the next correlated location from the second set as the weighted average of all candidate locations if any candidates were found, giving greater weight to candidates closer to the search point;

otherwise, if no candidates were found, determining that the search point cannot be the next correlated data location of the first set.

6. The method for correlating test data taken during two drives of claim 1, the step of obtaining the correlation distance comprises:

selecting a location from the first set;

determining a location in the second set that is the closest to the selected location from the first set; and determining the correlation distance as the distance between the selected point from the first set and the determined closest location from the second set.

7. The method for correlating test data taken during two drives of claim 1 further comprising:

determining at least one cluster of locations from the first set representing data taken during slow or halted movement; and determining a single point representing the average of data from each of the at least one cluster of locations.

8. The method for correlating test data taken during two drives of claim 1 further comprising:

determining the first location of the first set as the location for velocity check;

removing from consideration as a correlated location the location for velocity check if the data corresponding to the location for velocity check was taken during movement at less than a threshold velocity; and determining the next sequential location of the first set as the location for velocity check and repeating the step of removing from consideration if velocity is less than the threshold velocity.

9. The method for correlating test data taken during two drives of claim 1 further comprising:

determining at least one data variable that should have remained constant between data for a correlated location of the first set and data for a corresponding correlated location of the second set;

determining as the examined pair a correlated location of the first set and a corresponding correlated location of the second set;

determining a difference between the at least one data variable that should have remained constant in data from the examined pair;

compensating data from the examined pair using the determined any difference; and determining as the examined pair a correlated location of the first set and a corresponding correlated location of the second set which have not yet been the examined pair, and repeating the steps of determining any difference and compensating data.

10. A method for correlating geographic data from two sets, wherein a first set contains data taken at a sequence of locations along a first path and a second set contains data taken at a sequence of locations along a second path, and wherein locations within each sequence are numbered with integers in the order in which the data was collected as the corresponding path was traversed, the method comprising:

obtaining a correlation distance;

determining a first correlated location in the first set and a corresponding first correlated location of the second set such that the first correlated location in the second set is within the correlation distance of the first correlated location in the first set;

selecting as a search point the location following the first correlated location in the first set;

forming a correlation set from the second set based on the sequence number of the most recently determined correlated location in the second set and a search number;

determining as the next correlated location in the first set the search point if any location in the correlation set is within the correlation distance of the search point;

determining the corresponding correlated location in the second set if any location in the correlation set is within the correlation distance of the search point; and selecting as the next search point the location following the current search point and repeating the steps of forming a correlation set, determining the next correlated location in the first set, and determining the corresponding correlated location in the second set, until no locations remain in the first set.

11. The method of correlating geographic data of claim 10, the step of determining the first correlated location of the first set comprising:

selecting the first location of the first set as a possible first correlated location;

determining a search set as all locations of the second set which are within a search distance of the candidate; and determining the first correlated location of the first set as the possible first correlated location and determining the corresponding first correlated location of the second set as the location of the search set that is closest to the possible first correlated location if any location of the search set is within the correlation distance of the possible first correlated location;

otherwise selecting the next location of the first set as the possible first correlated location and repeating the steps of determining a search set and determining the first correlated location as the possible first correlated location if any location of the search set is also within the correlation distance.

12. The method of correlating geographic data of claim 10, the step of determining the first correlated location of the first set comprising:

selecting the first location of the first set as a possible first correlated location;

determining a search set as all locations of the second set which are within a search distance of the candidate; and determining the first correlated location of the first set as the possible first correlated location and determining the corresponding first correlated location of the second set as the weighted average of all locations of the search set also within the correlation distance of the possible first correlated location if any location of the search set is within the correlation distance of the possible first correlated location;

otherwise selecting the next location of the first set as the possible first correlated location and repeating the steps of determining a search set and determining the first correlated location as the possible first correlated location if any location of the search set is also within the correlation distance.

13. The method of correlating geographic data of claim 10, the step of forming a correlation set from the second set based on the sequence number of the most recently determined correlated location in the second set and the search number comprises including all locations from the second set that have a sequence number less than or equal to the sequence number of the most recently determined correlated location in the second set plus the search number and have a sequence number that is greater than or equal to the sequence number of the most recently determined correlated location in the second set minus the search number.

14. The method of correlating geographic data of claim 10, the step of determining the corresponding correlated location in the second set comprising determining as the correlated location of the second set the location in the correlation set which is closest to the search point.

15. The method of correlating geographic data of claim 10, the step of determining the corresponding correlated location in the second set comprising determining as the correlated location in the second set the weighted average of all locations in the correlation set that are within the correlation distance of the search point, with locations closer to the search point weighted heavier than locations farther from the search point.

16. The method of correlating geographic data of claim 10, the step of obtaining a correlation distance comprising:

selecting a location from the first set;

determining a location in the second set that is the closest to the selected location from the first set; and determining the correlation distance as the distance between the selected point from the first set and the determined closest location from the second set.

* * * * *